United States Patent
VanBlon et al.

(10) Patent No.: US 9,965,295 B2
(45) Date of Patent: May 8, 2018

(54) CREATING A CUSTOM SERIES OF COMMANDS

(71) Applicant: LENOVO (Singapore) PTE, LTD., New Tech Park (SG)

(72) Inventors: Russell Speight VanBlon, Raleigh, NC (US); John Carl Mese, Cary, NC (US); Nathan J. Peterson, Durham, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 117 days.

(21) Appl. No.: 14/015,655

(22) Filed: Aug. 30, 2013

(65) Prior Publication Data

US 2015/0067701 A1    Mar. 5, 2015

(51) Int. Cl.
*G06F 13/28*    (2006.01)
*G06F 9/44*    (2018.01)
*G06F 3/00*    (2006.01)

(52) U.S. Cl.
CPC ............................. *G06F 9/4443* (2013.01)

(58) Field of Classification Search
None
See application file for complete search history.

(56) References Cited

U.S. PATENT DOCUMENTS

| | | | | |
|---|---|---|---|---|
| 5,309,352 A | * | 5/1994 | Stubbs ................... | G05B 17/02 324/73.1 |
| 5,903,761 A | * | 5/1999 | Tyma ...................... | G06F 8/445 717/148 |
| 6,046,741 A | * | 4/2000 | Hochmuth .................... | 715/704 |
| 6,061,059 A | * | 5/2000 | Taylor et al. ................ | 715/764 |
| 2006/0218542 A1 | * | 9/2006 | Liu et al. ...................... | 717/154 |
| 2010/0241842 A1 | * | 9/2010 | Acedo et al. ................ | 713/100 |

* cited by examiner

*Primary Examiner* — Hyun Nam
*Assistant Examiner* — Dean Phan
(74) *Attorney, Agent, or Firm* — Kunzler, PC (57) ABSTRACT

For creating a custom series of commands, a method is disclosed that includes maintaining a record of executed commands, determining a time to select a subset of executed commands, selecting a subset of the executed commands for execution, and creating a shortcut to execute the selected commands.

17 Claims, 8 Drawing Sheets

CREATING A CUSTOM SERIES OF COMMANDS

FIELD

The subject matter disclosed herein relates to using a computing device and more particularly relates to creating a custom series of commands for the computing device.

BACKGROUND

Description of the Related Art

In general, computing devices may receive commands from a user, or may perform commands in response to an operating system, a software application, a software daemon, other software, or the like. Typically, received commands are consistent with a variety of patterns. For example, a user may use a computing device to check email on a daily basis. Checking email on a computing device may require several commands.

In some scenarios, a user may create a shortcut that issues several commands, however, this is typically done by a user recording a certain set of commands. For example, a user would issue a command to record the next set of commands, perform the next set of commands, and then issue a command to stop recording. The recorded set of commands may be assembled into a macro for subsequent execution.

However, if the user issues the set of commands inaccurately, the recording must be redone. Also, a computing device may request another action while the user is recording. Responding to this other action may cause the responses to be included in the recording macro, contrary to the user's intentions. Recording a macro with the correct set of commands may take several attempts.

BRIEF SUMMARY

An apparatus for creating a custom series of commands is disclosed. A method and computer program product also perform the functions of the apparatus. In one embodiment, an apparatus includes a history module configured to maintain a record of executed commands. In another embodiment, the record may begin without user intervention. In a further embodiment, the apparatus may include a selection module configured to select a subset of the executed commands for execution. In one embodiment, the apparatus may include a shortcut module configured to create a shortcut, and the shortcut may execute the selected subset of commands.

In one embodiment, the apparatus includes an indication module configured to indicate the executed commands to be included in the subset. In another embodiment, the selection module may select the subset of commands based on the indications. In a further embodiment, the executed commands included in the subset were executed in a common application. In one embodiment, the commands include configuration settings for an operating system. In another embodiment, the record includes a threshold number of recently executed commands. In a further embodiment, the record includes commands executed over a recent threshold period of time.

In one embodiment, the apparatus includes a determination module configured to ascertain a time for the selection module to select the set of executed commands. In another embodiment, the determination module ascertains a time based on a repeated pattern of executed commands. In a further embodiment, the determination module ascertains a time in response to a command from a user.

In one embodiment, the apparatus includes a trim module configured to remove commands from the set that do not materially affect the apparatus. In another embodiment, the trim module removes commands from the set by one of removing commands not executed in a common application, removing commands executed in response to a request form an operating system, and removing commands that did not materially affect an apparatus performing the method.

A method is disclosed that creates a custom series of commands. In one embodiment, the method includes maintaining a record of executed commands. In another embodiment, the executed commands include commands for a computing device. In a further embodiment, the method includes determining a time to select a subset of executed commands. In one embodiment, the method includes selecting a subset of the executed commands for execution. In a further embodiment, the method includes creating a shortcut to execute the selected commands.

In one embodiment, the method includes removing commands from the subset that do not materially affect the apparatus. In another embodiment, selecting a subset includes selecting executed commands that were executed in a common application. In a further embodiment, the record includes commands executed over a recent threshold period of time. In one embodiment, determining a time is based on one of a repeated pattern of executed commands, and a request form a user.

A program product comprising a computer readable storage medium storing machine readable code executable by a processor to perform operations is disclosed. In one embodiment, the operations include maintaining a record of executed commands at a computing device. In another embodiment, the operations include determining a time to select a subset of recently executed commands. In a further embodiment, the operations include selecting a subset of the recently executed commands based on one of a repeated pattern of executed commands, and a request form a user. In another embodiment, the operations include creating a shortcut to execute the selected commands.

In one embodiment, the operations further include removing commands from the subset that do not materially affect the apparatus. In another embodiment, selecting a subset includes selecting executed commands that were executed in a common application. In a further embodiment, maintaining a record includes one of storing commands executed over a recent period of time and storing a threshold number of recent commands.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code. Descriptions of Figures may refer to elements described in previous Figures, like numbers referring to like elements. In order to address the current state of the art, the present application disclose several embodiments of a method, system, and apparatus for creating a custom series of commands.

A computing device, as used herein, means at least a device capable of performing logic operations. A computing device may include a processor, several processors, a multi-core processor, memory, a screen, or the like. For example, a computing device, may be a personal computer, a handheld computer, a mobile device, a cellular phone, a tablet computer, a laptop computer, or other, or the like.

Commands for a computing device may include commands issued by an operating system of the computing device. Commands may also include commands received by a software application executing on the computing device. Commands may also include commands received from a user of the computing device. Commands from a user may include commands received via a keyboard, mouse, touch screen, commands received via an audio signal, electronic signal, video signal, commands received via a gesture sensor, or other, or the like. One skilled in the art may recognize other ways commands may be provided to a computing device, and this disclosure is not limited in this regard. Commands may also include meta data for the command. For example, a record for a command may include location information, time information, sequence information, or the like.

Commands may also include spatial information. In one example, a command may include a touch location on a touch screen, a click location for a pointing device, or the like. Commands may also include time information. For example, a record for a command may include a date and time when the command was executed. In one embodiment, a command may also include source information. For example, a record for a command may also store if the command originated at an operating system, a software application, a daemon or other process, a user interface, an input device, or the like.

Figure 1:
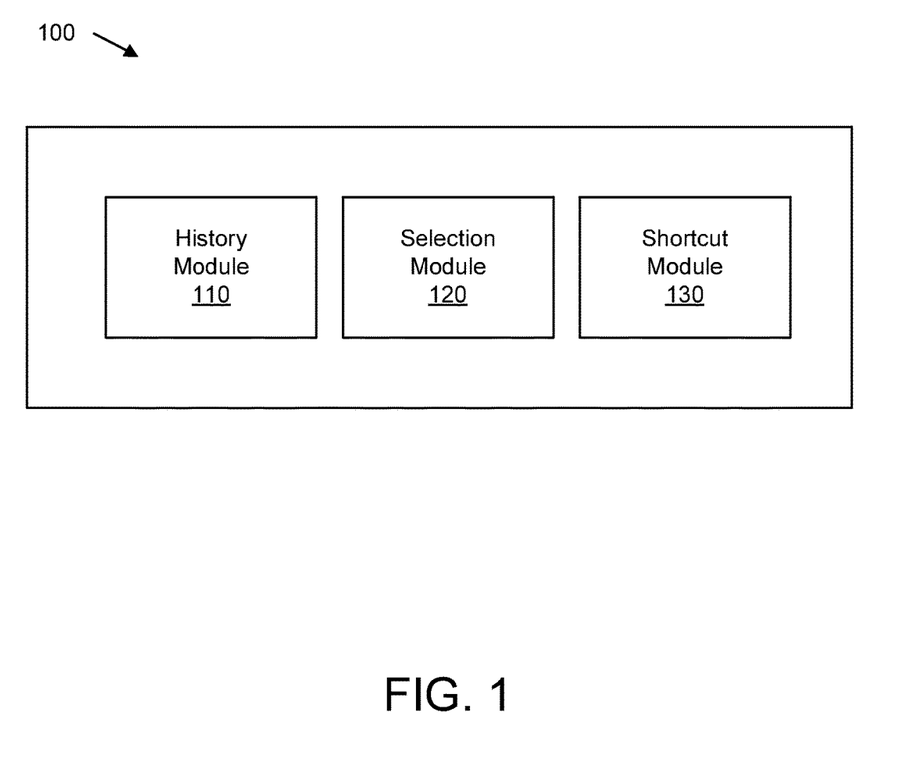
FIG. 1 is a schematic block diagram illustrating one embodiment of an apparatus for creating a custom series of commands.

FIG. 1 is a schematic block diagram illustrating one embodiment of an apparatus 100 for creating a custom series of commands. In one embodiment, the apparatus 100 includes a history module 110, a selection module 120, and a shortcut module 130.

In one embodiment, a history module 110 may be configured to maintain record of executed commands. A history module 110 may operate as part of an operating system for a computing device, and may track, store, record, or the like, commands that may be executed at a computing device. In another embodiment, a history module 110 may receive commands from devices external to the computing device.

In one embodiment, the commands may be requested by an operating system of the computing device. In another embodiment, the commands may be received from a user interface, via a input device, such as, but not limited to, a keyboard, a mouse, a touch screen, a camera, a microphone, or the like.

In one embodiment, a history module 110 may store executed commands on a storage device of a computing device. In another embodiment, a history module may store executed commands in a volatile memory device, or the like. The executed commands may be stored in a wide variety of different formats as one skilled in the art may appreciate. Additionally, a record of executed commands may be stored together in a single file or block of a storage device.

In one embodiment, a history module 110 maintain a record of executed commands by copying executed commands to a storage area. In one embodiment, executed commands may be represented by a text file, a binary file, an XML file, or the like.

In one embodiment a history module 110 may begin maintaining a record of executed commands when an operating system of a computing device boots. In another embodiment, a history module 110 may begin maintaining a record of executed commands in response to the computing device executing an application. In one embodiment, a history module 110 may begin maintaining a record of executed commands in response to receiving a command from another computing device, another module, a user of the computing device, or the like.

In one embodiment, a history module 110 may temporarily suspend recording executed commands. For example, a user may reboot a computing device. In response to receiving a reboot command, a history module 110 may stop recording executed commands. A history module 110 may store a flag to indicate that the history module 110 had been recording when the computing device was shutdown. After rebooting, a history module 110 may automatically continue recording. A history module 110 may automatically continue recording based on the stored indicator or flag. In another embodiment, a history module 110 may automatically continue recording after a reboot by default without requiring an indicator.

In one embodiment, a history module 110 may temporarily pause recording commands in response to the operating system for a computing device performing an automated function. For example, a user may be using a computing device, and a history module 110 may be recording commands. An operating system for the computing device may perform an update sequence that may interrupt the user's operation. Therefore, in one embodiment, commands associated with an automated function of an operating system (i.e. an operating system update) may not be included in the record of executed commands. In another embodiment, the history module 110 may include commands associated with an automated function by an operating system in the record of executed commands.

In one embodiment, a history module 110 may maintain a record of executed command that includes a threshold number of the most recently executed commands. For example, a history module 110, may maintain a record of the most recent 100 executed commands. Of course, other values may be used depending on the capabilities of the computing device, the desires of a user of the computing device, a configuration settings, or the like. Therefore, a history module 110 may maintain a record of executed command that includes hundreds, thousands, millions, or more of the most recently executed commands.

In another embodiment, a history module 110 may maintain a record of commands executed over a recent threshold period of time. For example, a history module 110, may maintain a record of commands that include commands executed over the past 5 minutes. Of course, other values may be used depending on the capabilities of the computing device, the desires of a user of the computing device, memory capabilities, configuration settings, configuration parameters, or the like. Therefore, a history module 110 may maintain a record of executed commands that spans the past several minutes, hours, days, and years. Therefore, this disclosure is not limited in this regard.

In another embodiment, a history module 110 may maintain a record of commands executed at a computing device, where the commands include operating system commands, software application commands, hardware commands, or the like. Although the commands are typically sequential, this disclosure is not limited in this regard. For example, a computing device may include more than one processor, many processors, or cores of a processor that may execute commands concurrently. Therefore, a history module 110 may maintain a record of executed commands at a computing device, however, there is no requirement that the executed commands be sequential.

In one embodiment, the apparatus 100 may include a selection module 120. A selection module 120 may be configured to select a subset of the executed commands for execution. In one embodiment, a selection module 120 may select a subset of the executed commands in response to a repeated pattern of executed commands. In another embodiment, a selection module 120 may select a subset of the executed commands in response to a request from a user of the computing device.

In one embodiment, a selection module 120 may select a threshold number of recently executed commands. For example, in response to a request from a user, a selection module 120 may select the most recent 100 executed commands. In one embodiment, a selection module 120 may select a threshold number of recently executed commands that were executed in a common application. For example, where the most recent 100 executed commands, 20 may have been operating system commands, such as changing settings, configuration parameters, or executing other applications, and 80 of the recent 100 executed commands may have been executed in a common application. In one example, the 80 commands may have been executed in an office application. In another example, the 80 commands may have been executed in an email application, or other, or the like.

In another embodiment, a selection module 120 may select a threshold number of recently executed commands that were operating system commands. For example, where the most recent 20 executed commands, 15 may have been operating system commands, such as changing settings, configuration parameters, or executing other applications, and 5 of the recent 20 executed commands may have been executed in a common application. Therefore, in response to a request by a user, a selection module 120 may select the 15 of the recent 20 executed commands that were executed as operating system commands, and may ignore the 5 executed commands executed in another application.

In another embodiment, the selection module 120 may maintain a record of executed commands since a computing device had rebooted. In one embodiment, each reboot of a computing device may result in a selection module 120 starting a new record of executed commands. Therefore, a selection module 120 may select all commands that were executed since a computing device had reset, rebooted, re-initialized, or the like.

In another embodiment, a selection module 120 may select recently executed commands based on more than one of the previous selection strategies. For example, a history module 110 may maintain a record of the most recent 100 executed commands, and a selection module 120 may select the most recent 20 executed commands in a common application.

In another embodiment, regardless of the number of commands being maintained by a history module 110, a selection module 120 may limit a number of commands based on a setting, a configuration parameter, or a request from a user, or the like. For example, a configuration parameters may indicate that the most recent 100 commands should be selected into a subset, however, a user may indicate that the most recent 20 commands should be selected into a subset. Therefore, a selection module 120 may receive conflicting instructions, and may prioritize instructions received from multiple sources. In one example, a selection module 120 may place a higher priority on a request from a user, compared with a configuration parameters of the computing device.

In one embodiment, the apparatus 100 may include a shortcut module 130. A shortcut module 130, in one embodiment, may be configured to select a subset of the executed commands for execution. In another embodiment, a shortcut module 130 may receive a set of commands from a selection module 120. A shortcut module 130 may incorporate the received commands in a shortcut icon that may be executable by a user. In another embodiment, a shortcut module 130 may include received commands in a script that may be executed by a user, another process, or the like. One skilled in the art may recognize other ways in which a set of commands may be executed. These methods depend on the functionality and capability of various operating systems. This disclosure is meant to include all such means for executing many commands or operations based on one action by a user.

In another embodiment, a shortcut module 130 may be configured to execute the selected subset of commands. For example, instead of including the subset of commands in a script, or other shortcut as supported by an operating system, a shortcut module 130 may store the subset of commands internally. Therefore, a shortcut module 130, in one embodiment, may receive a command from a user to execute a subset of commands and the shortcut module 130 may executed the subset of commands instead of creating an operating system short, a script, or other, or the like, to execute the commands.

In one embodiment, a shortcut module 130 may execute a subset of executed commands. In one embodiment, a shortcut module 130 may execute a subset of executed commands non-sequentially. In another embodiment, a shortcut module 130 may execute a subset of executed commands substantially similar to how the commands were executed. For example, a shortcut module 130 may consider time information in the record of executed commands, and executed the executed commands consistent with time delays between commands when they were recorded.

In another embodiment, a shortcut module 130 may ignore time information with a subset of executed commands. For example, where a history module 110 recorded commands that included several seconds between commands, and a selection module 120 selected a subset of commands as previously described, a shortcut module 130 may execute the executed commands without the several seconds between the commands. Therefore, in one embodiment, a shortcut module 130 may ignore time information associated with the commands, and execute the executed commands slower than they were originally executed, or faster than when they were originally executed.

Figure 2:
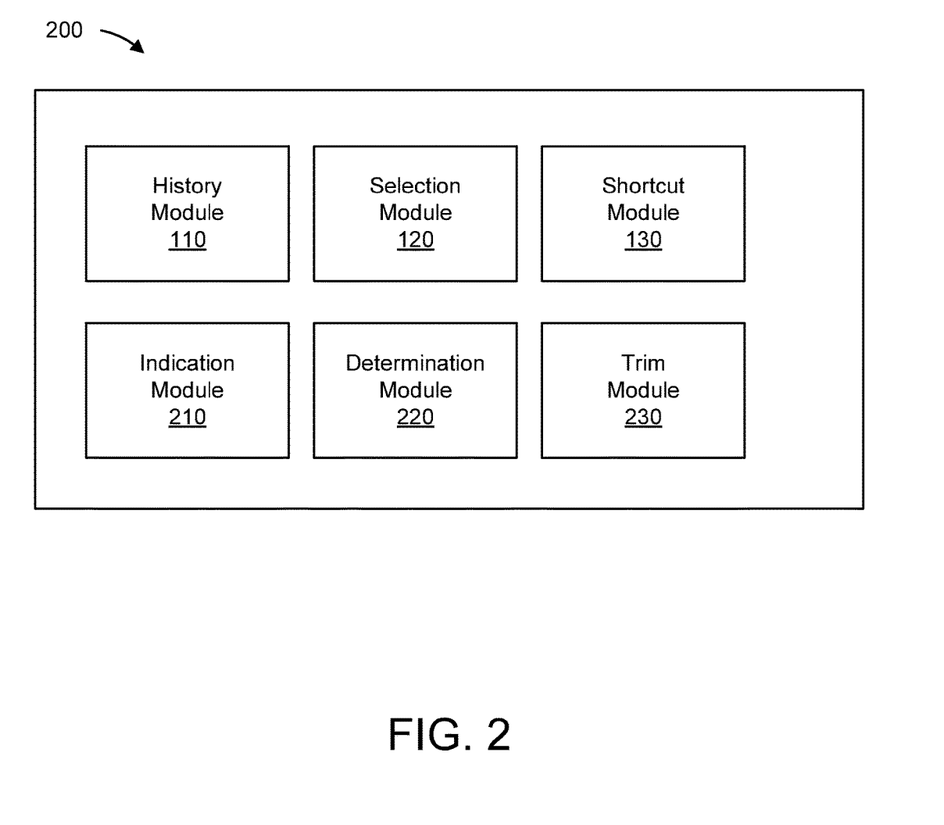
FIG. 2 is another schematic block diagram illustrating one embodiment of an apparatus for creating a custom series of commands.

FIG. 2 is another schematic block diagram illustrating one embodiment 200 of an apparatus for creating a custom series of commands. In one embodiment, an apparatus 200 may include s history module 110, a selection module 120, a shortcut module 130, an indication module 210, a determination module 220, and a trim module 230. The history module 110, the selection module 120, and the shortcut module 130 may or may not be substantially similar as similar modules depicted in FIG. 1.

In one embodiment, an apparatus 200 may include an indication module 210. An indication module 210, in one embodiment, may be configured to indicate the executed commands to be included in a subset of executed commands. A selection module 120 may select a subset of commands, as previously described, and based on indications from an indication module 210.

In one embodiment, an indication module 210 may indicate commands to be included in a subset of executed commands based on a time when the commands to be included were originally executed. In another embodiment, an indication module 210 may indicate commands to be included in a subset of executed commands based on commands that were executed in a common application.

In one embodiment, an apparatus 200 may include a determination module 220. In one embodiment, a determination module 220 may be configured to ascertain a time for the selection module 120 to select a set of executed commands. In another embodiment, a determination module 220 may ascertain a time for the selection module 120 to select a set of executed commands based on a repeated pattern of executed commands. In another embodiment, a determination module 220 may ascertain a time for the selection module 120 to select a set of executed commands in response to a command from a user of a computing device.

Figure 3:
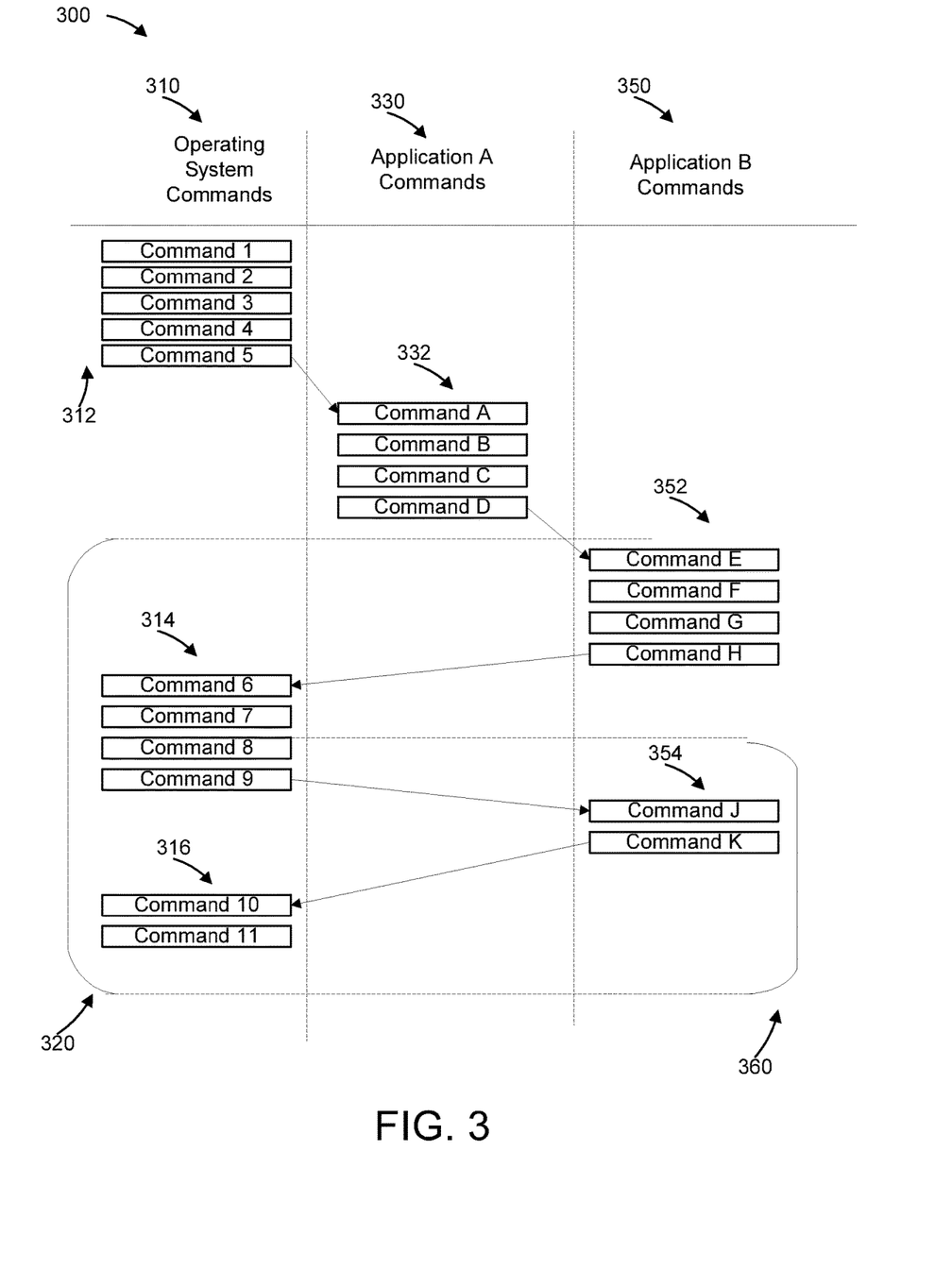
FIG. 3 is a sequence diagram illustrating one embodiment of commands executed on a computing device.
Figure 4:
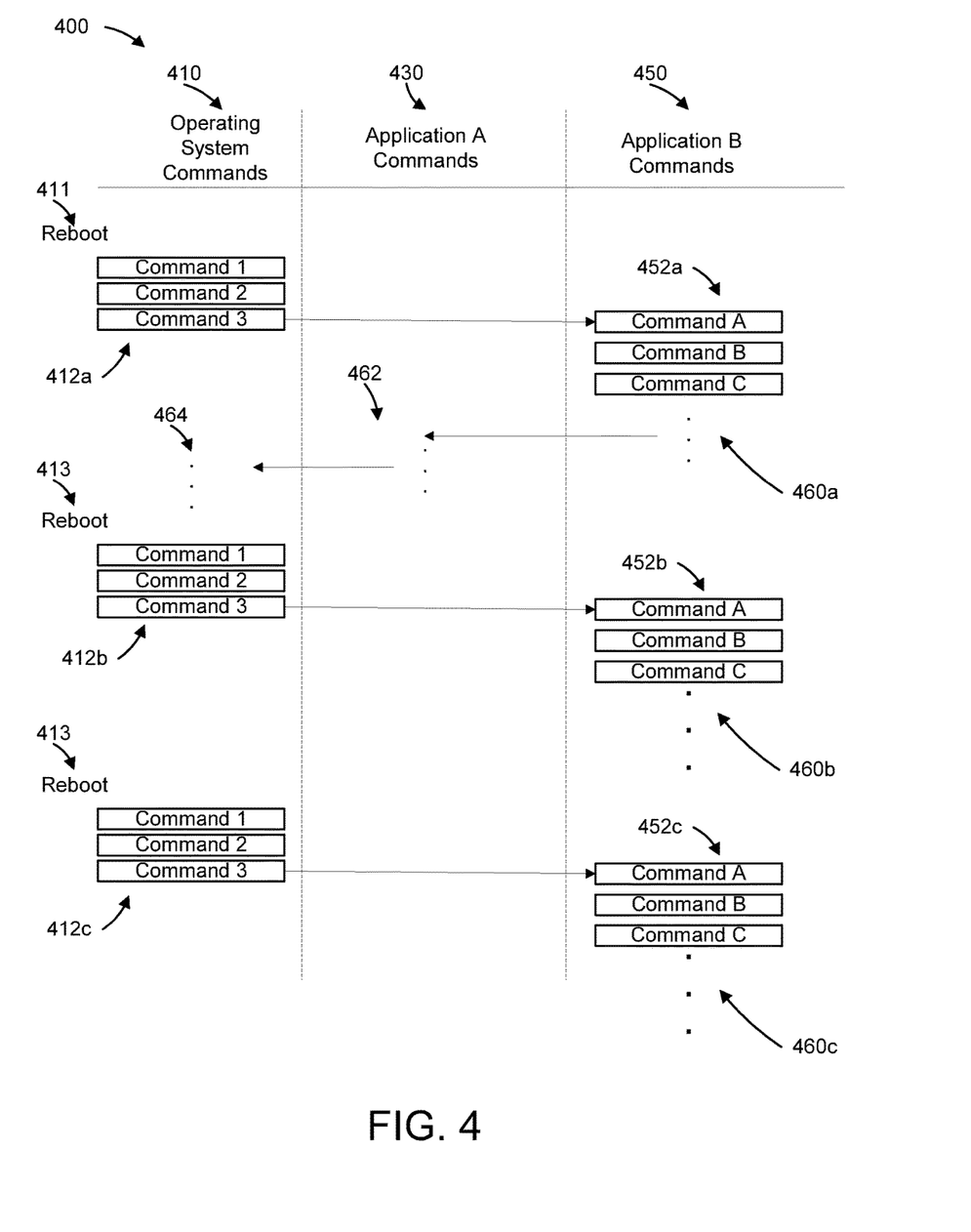
FIG. 4 is another sequence diagram illustrating one embodiment of commands executed on a computing device.
Figure 5:
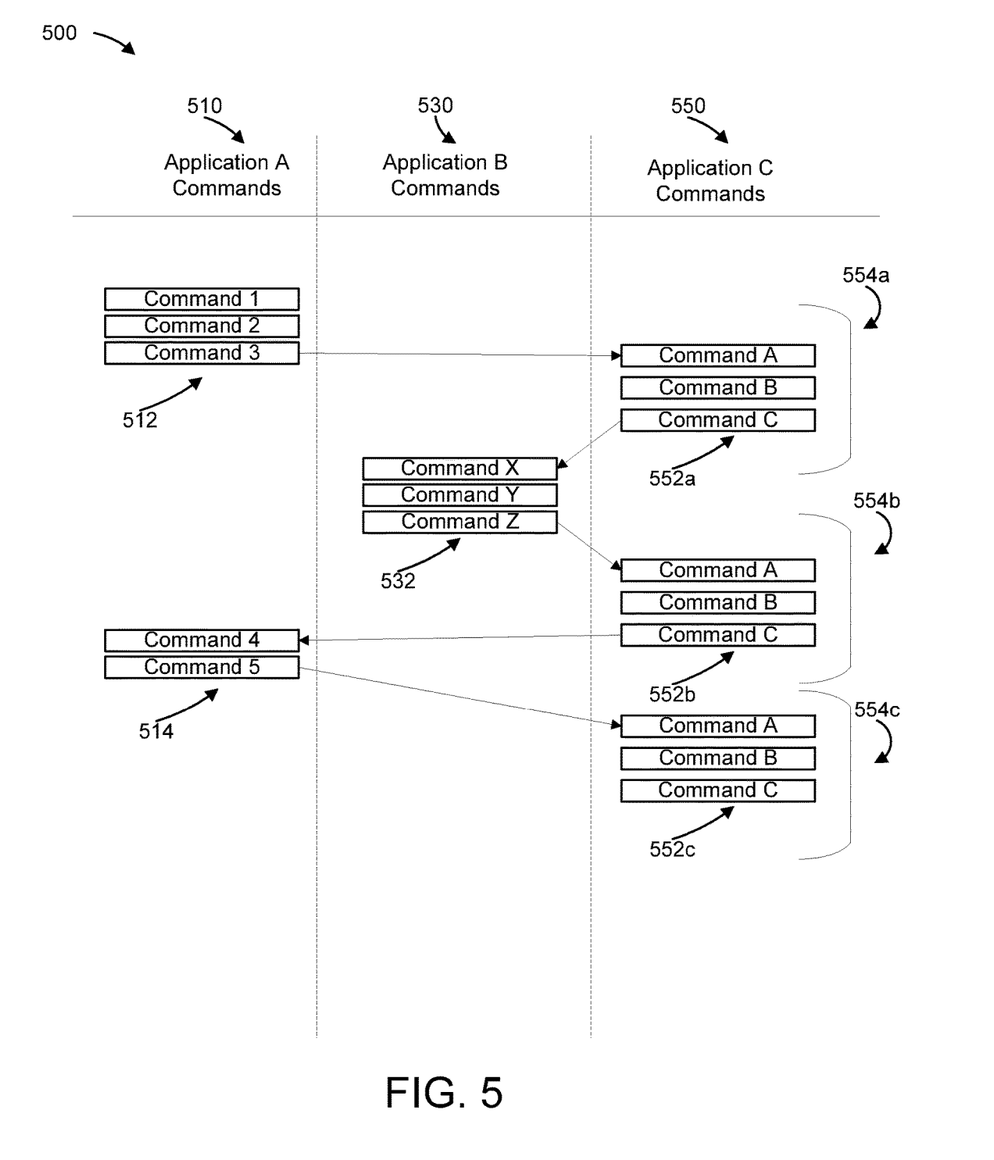
FIG. 5 is another sequence diagram illustrating one embodiment of commands executed on a computing device.

In another embodiment, a determination module 220 may indicate a subset of commands to select as part of a subset of executed commands based on a recognized pattern of executed commands. Further embodiment, of example patterns are depicted in FIGS. 3-5. In one example, when a computing device initializes, a user of the computing device may configure one or more operating system parameters. For example, a user may configure similar operating system parameters each time the computing device initializes or boots up. Therefore, a determination module 220 may recognize a pattern of setting operating system parameters when a computing device boots, and indicate to a selection module 120 the subset of executed commands to be selected.

In another example, a user of a computing device may perform several commands, or cause the computing device to perform several commands after initializing an application of the computing device. In one embodiment, the commands may be for the initialized application, or are executed in a common application. Therefore, in one embodiment, the determination module 220 may indicate commands to be included in a selection of executed commands based on commands being executed in a common application.

In one embodiment, an apparatus 200 may include a trim module 230. A trim module 230, in one embodiment, may be configured to remove commands from a selected subset of executed commands that do not materially affect the apparatus 200. In one example, an undo command executed in an application may reverse or nullify a previous command. In one example, the previous command and the undo command may be included in a selected set of executed commands. Therefore, in one embodiment, a trim module 230 may remove both an undo command, and the command that the undo command undid.

In an example, there may be no material difference in results from executed commands if the previous command and the undo command were included in a selected subset of commands, and if the previous command and the undo command were not included in a subset of commands (having been removed from the subset by the trim module 230). Therefore, in some example, commands that may be selected to be in a subset of executed commands may not materially affect the apparatus. A trim module 230 may determine and remove commands that do not materially affect the apparatus.

In another example, a selection module 120 may select a subset of commands. One command of the subset may include changing a view setting from 100% to 50% view ratio. A subsequent command of the subset may include changing a view setting from 50% to 100%. A trim module 230 may determine that changing a view setting from 100% to 50%, and then from 50% to 100%, in combination, do not materially affect the apparatus 200. Therefore, a trim module 230 may remove the two view commands from a selected subset of executed commands. This may make a corresponding subset of commands to include less commands and may result in a faster execution of the subset of commands. Of course, other view settings may be used, and other commands may have been included in the subset that do not materially affect the apparatus, or do not materially affect a document or file of the apparatus. A trim module 230 may determine and remove such commands from a selected subset of executed commands.

In another embodiment, a trim module 230 may remove commands based on an application for which the command was executed. For example, executed commands may include operating system commands, and commands originating at one or more application executing on a computing device. A trim module 230 may remove commands that were not executed in a common application. For example, a trim module 230 may remove operating system commands leaving commands associated with an application remaining in the selected subset of executed commands. In other examples, a trim module 230 may remove commands associated with an application, and leave operating system commands in the selected subset of executed commands.

FIG. 3 is a sequence diagram illustrating one embodiment 300 of commands being executed on a computing device. In one embodiment, a computing device may execute commands including operating system commands 310, application A commands 330, and application B commands 350.

Operating system commands may include a first set 312 of executed commands including commands numbered 1 through 5. Operating system commands may also include a second set 314 of executed commands numbered commands 6 through 9. Operating system commands may also include a third set 316 of executed commands including commands numbered 10 and 11.

In one embodiment, Application A commands may include a first set 332 of executed commands including commands A through D. In another embodiment, Application B commands may include a first set 352 of executed commands E through H, and subsequently in a second set 354 of commands J and K. A user using a computing device may execute commands from top to bottom of FIG. 3. For example, command sets 312, 332, 352, 314, 354, 316 may be executed in the following order: 312, 332, 352, 314, 354, and 316. Therefore, in one example, a user may execute several 312 operating system commands 310, then execute several commands A-D 332 in Application A 330, then execute several commands 352 in Application B, then execute several operating system 310 commands 314, then executed commands J and K, then execute operating system 310 commands 10 and 11. This example is only one illustration of a potential usage of a computing device, and one skilled in the art will recognize many other command sequences and this disclosure is intended to cover all such sequences of commands, operating system commands, application commands, or the like.

In one embodiment, a history module 110 may maintain a record of executed commands. The record of executed commands may include commands 1 through 11, and commands A through K. In other embodiment, a history module 110 may include many more commands that may have been executed prior to command 1. In one embodiment, a selection module 120 may select a subset of the executed commands as previously described. For example, a selection module 120 may select commands 320 executed in Application B. Therefore, because commands E through K occurred in a common application, a selection module 120 may select commands E, F, G, H, J, and K to be included in a selected subset of executed commands.

In one embodiment, a selection module 120 may select a subset of the executed commands 360 executed in a recent period of time. For example, a threshold period of time may include command 8 and subsequent commands, including, commands 7-9, commands J and K, and commands 10 and 11. Therefore, a selection module 120 may select the indicated commands based on the commands being executed in a recent threshold period of time.

In one embodiment, a selection module 120 may select a subset of the executed commands 360 based on a threshold number of commands. For example, a threshold number of commands may be 6 commands. Therefore, a selection module 120 may select commands 8, 9, J, K, 10, and 11 to be included in a selected subset of executed commands.

In another embodiment, a selection module 120 may select commands sets 352, 314, 354, and 316 to be included in a selected set of executed commands as previously described. Thereafter, a trim module 230 may remove commands 6-11 leaving commands E-K in the selected subset.

FIG. 4 is another sequence diagram illustrating one embodiment 400 of commands executed on a computing device. As similarly indicated in FIG. 3, FIG. 4 depicts a sequence of commands from top to bottom. FIG. 4 depicts operating system commands 410 and Application B commands 450. Also, at times, a computing device may reboot, reinitialize, restart, or the like. Therefore, the "Reboot" 411 depicted in FIG. 4 may also include rebooting, reinitializing, restarting, waking up from a hibernation state, or the like.

After a computing device boots 411, an operating system 410 may issue several commands 412a. A user may then cause commands in an application 450 to be executed 452a. Thereafter, a user may cause other commands 460 to be executed. These other commands may include hundreds or thousands of different commands. Other commands 462, 464 may include commands in another application, such as, but not limited to Application A 430.

In one embodiment, a similar sequence of commands may be executed after another reboot 413. For example, an operating system 410 for the computing device may repeat commands 1-3 in another sequence 412b. Similarly, a user may then execute or cause to be executed commands A, B, and C in command set 452b. Command set 452b may be substantially similar to commands 452a. A user, or operating system of the computing device may continue to perform or execute other commands 460b. Commands 460b may not be similar to commands 460a. After many other commands 460b have been executed, a computing device may again reboot 415. Similarly, a sequence of commands may be executed 412c. For example, an operating system 410 for the computing device may repeat commands 1-3 in another sequence 412c. Similarly, a user may then execute or cause to be executed commands A, B, and C in command set 452c. Command set 452c may be substantially similar to commands 452a. A user, or operating system of the computing device may continue to perform or execute other commands 460c. Commands 460c may not be similar to commands 460a.

In one embodiment, a selection module 120, or an indication module 210 may recognize the sequence of commands including commands 412,452 after successive reboots. A selection module 120 may detect the repeated pattern of commands 412,452. Although there may be additional commands 460 between a recognized pattern and a reboot, a selection module 120 may determine that a pattern has been repeated and may inquire a user of a computing device if a shortcut should be created to replicate the repeated pattern of commands 412,452. In response to an affirmative response from a user, a shortcut module 130 may create a shortcut to execute the selected commands. In this way, a computing device may recognize and create shortcuts for a user that repeats sequences of commands. The shortcut may be created without requiring a user to configure or record a macro, or the like.

FIG. 5 is another sequence diagram illustrating one embodiment 500 of commands executed on a computing device. As similarly depicted in FIGS. 3 and 4, FIG. 5 depicts a sequence of commands from top to bottom. Application A 510 commands are represented in the left-most column. Application B commands 530 are represented in the middle column, and Application C commands 550 are represented in the right-most column.

A user may issue commands to a computing device using a software application or the like. As described herein, a software application may include instructions executable by a processor to perform functions on the computing device. The functions may also include higher level commands, such as, but not limited to, save a document, load a document, check email, browse an Internet web site, or execute or use any other software application available via the operating system of the computing device.

As depicted in FIG. 5, a user may issue a set of commands 512 (commands 1-3) in Application A 510. Thereafter a user may instantiate application C and issue several commands 552a (commands A-C). Then, a user may instantiate application B 530 and execute commands 532 (commands X-Z). Later, a user may again instantiate Application C and execute commands 552b (commands A-C). A user may execute commands 415 (commands 4 and 5) in Application A. A user may yet again instantiate Application C and execute commands 552c (commands A-C).

In one embodiment, a determination module 220 may recognize a pattern 554a,554b,554c of commands including commands A-C which may be initially executed when a user instantiates application C. A determination module 220 may indicate to a selection module 120 that commands A-C should be selected into a subset of commands. A selection module 120 may then select commands A-C into the subset, and a shortcut module 130 may create a shortcut that may execute the selected subset of commands. Therefore, in this way, a shortcut may be created that may instantiate application C and then execute commands A-C. This may allow a computing device to automatically execute commands A-C after a user selects the shortcut.

In another embodiment, as previously described, a determination module 220 may also request, from a user of the computing device, if a shortcut should be created that includes commands A-C. An affirmative response from the user may cause the shortcut module 130 to create the shortcut that includes the indicated commands. A negative response may result in a shortcut not being created by the shortcut module 130. In one embodiment, a determination module 220 may be notified that a user of a computing device may not desire a shortcut for the recognized pattern of commands. Therefore, a determination module 220 may not request that a shortcut be created when the pattern is again recognized.

In another embodiment, a user may request that a shortcut be created. In response to such a command from a user, a selection module 120 may select commands executed in an application executed since the instantiation of the application. For example, after instantiating application C, and executing commands A, B, and C, a user may request that a shortcut be created. A selection module 120 may then create a short that includes instantiating the application C 550, and executing the commands A, B, and C executed by the user in that application, and before the request to create the shortcut was received. Thereafter, a user may select the shortcut which may cause the computing device to instantiate application C and execute commands A, B, and C 554c.

Figure 6A:
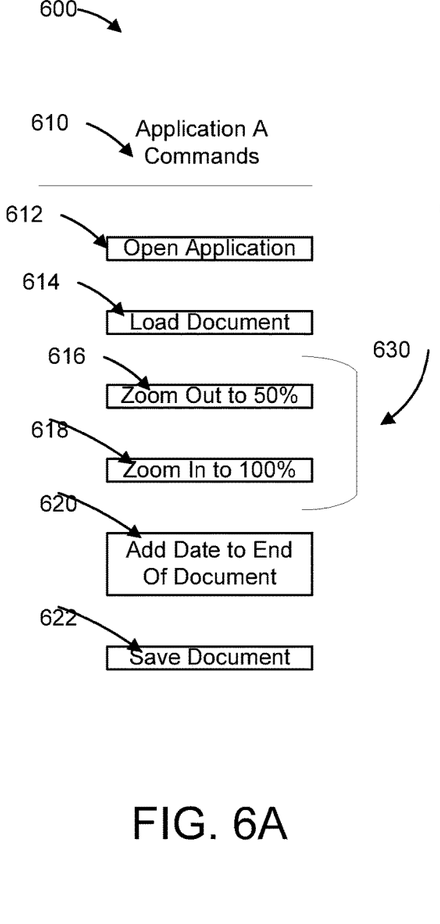
FIG. 6A is a diagram illustrating a series of commands executed on a computing device.

FIG. 6A is a diagram illustrating a series 600 of commands executed on a computing device, in accordance with one embodiment. In one embodiment, a user may instantiate Application A 610 on a computing device. A user may then execute a command to load 614 a document. Next, a user may zoom out 616 a view of the document. Next, a user may zoom in 618 a view of the document. Next a user may add 620 a date to the end of a document, or otherwise materially alter the document. Last, a user may save 622 the document.

In one embodiment, the command set 630 including zooming out 616 and zooming in 618, may not materially alter the document, or the computing device processing the application. Therefore, in one embodiment, a trim module 230 may remove the zoom out command 616 and the zoom in command 618 from the subset of selected executed commands. Therefore, these two zoom commands, in this embodiment, would not be included in a shortcut created by the shortcut module 130.

Figure 6B:
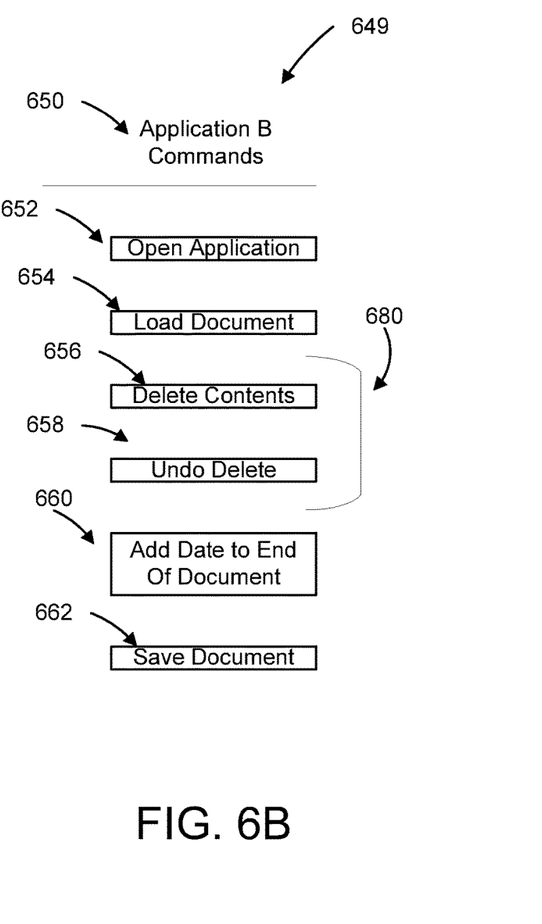
FIG. 6B is a diagram illustrating a series of commands executed on a computing device.

FIG. 6B is a diagram illustrating a series 649 of commands executed on a computing device, in accordance with one embodiment. In one embodiment, a user may instantiate Application B 652 on a computing device. A user may then execute a command to load 654 a document. Next, a user may delete 656 contents in the document. Next, a user may undo 658 the previous delete. Next a user may add 620 a date to the end of a document, or otherwise materially alter the document. Last, a user may save 622 the document.

In one embodiment, the command set 680 including deleting contents 656 and undoing 658 the delete may not materially alter the document, or the computing device processing the application. Therefore, in one embodiment, a trim module 230 may remove the delete contents command 656 and the undo delete command 658 from the subset of selected executed commands. Therefore, these two zoom commands, in this embodiment, may not be included in a shortcut created by the shortcut module 130.

Figure 7:
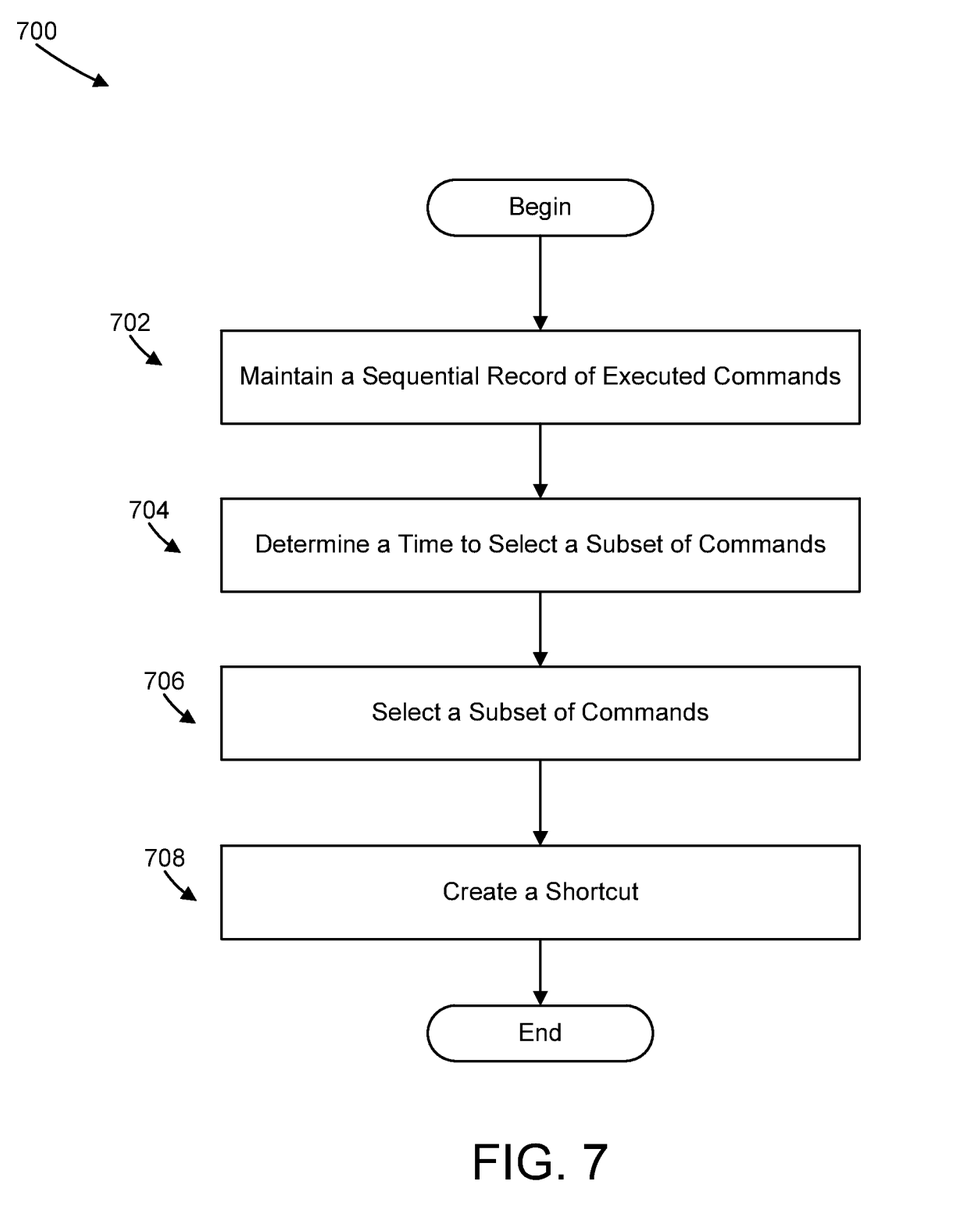
FIG. 7 is a schematic flow chart diagram illustrating one embodiment of a method for creating a custom series of commands.

FIG. 7 is a schematic flow chart diagram illustrating one embodiment of a method 700 for creating a custom series of commands. In one embodiment, the method 700 begins and a history module 110 maintains 702 a record of executed commands at a computing device. A determination module 220 ascertains 704 a time to select a subset of executed commands. A selection module 120 may select 706 a subset of the executed commands. A shortcut module 130 may create 708 a shortcut for executing the selected subset of commands, and the method 700 may end.

Figure 8:
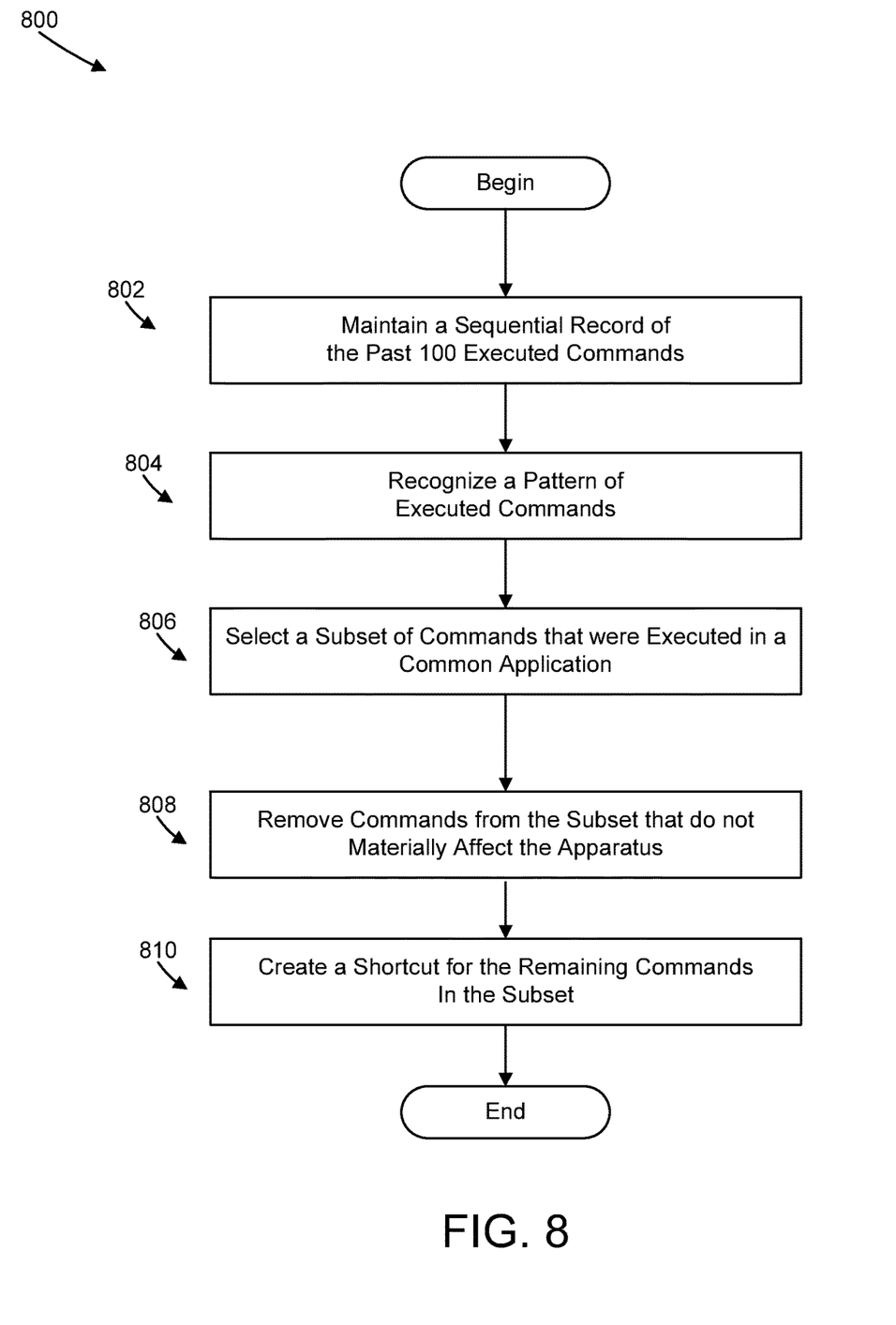
FIG. 8 is a schematic flow chart diagram illustrating one embodiment of a method for creating a custom series of commands.

FIG. 8 is a schematic flow chart diagram illustrating one embodiment of a method 800 for creating a custom series of commands. In one embodiment, the method 800 begins and a history module 110 maintains 802 a record of the past 100 executed commands. A determination module 220 may recognize 804 a pattern of executed commands. A selection module 120 may select 806 a subset of commands that were executed in a common application. A trim module 230 may remove commands from the subset that do not materially affect an apparatus performing the method 800. A shortcut module 130 may create 810 a shortcut for the remaining commands in the subset, and the method may end.

What is claimed is:

1. A method comprising:
maintaining a record of executed commands, the executed commands comprising commands for a computing device, wherein the executed commands comprise time information that indicates a date and a time that a respective executed command was executed;
ascertaining a time to select a subset of executed commands;
selecting a subset of the executed commands for execution, the subset based on the ascertained time;
removing commands from the subset of the executed commands to produce a reduced set of commands, wherein the removed commands from the subset of the executed commands comprise a first one or more commands and a second one or more commands, the second one or more commands undoes the first one or more commands during execution, the first one or more commands and the second one or more commands are removed because the second one or more commands undoes the first one or more commands during execution, and removing the commands from the subset of the executed commands comprises maintaining an order of the subset of the executed commands in the reduced set of commands such that remaining commands in the reduced set of commands have a same order as corresponding commands in the subset of the executed commands;
ignoring time information of the remaining commands such that there is no time delay between execution of consecutive commands; and
creating a shortcut to execute the reduced set of commands.

2. The method of claim 1, wherein selecting a subset comprises selecting executed commands that were executed in a common application.

3. The method of claim 1, wherein the record comprises commands executed over a recent threshold period of time.

4. The method of claim 1, wherein the determining a time is based on one of a repeated pattern of executed commands, and a request from a user.

5. An apparatus comprising:
a processor;
a memory storing code executable by the processor, the code comprising:
a history module configured to maintain a record of executed commands without user intervention, wherein the executed commands comprise time information that indicates a date and a time that a respective executed command was executed;
a selection module configured to select a subset of the executed commands for execution;
a trim module configured to remove commands from the subset of the executed commands to produce a reduced set of commands, wherein the removed commands from the subset of the executed commands comprise a first one or more commands and a second one or more commands, the second one or more commands undoes the first one or more commands during execution, the first one or more commands and the second one or more commands are removed because the second one or more commands undoes the first one or more commands during execution, the trim module is configured to maintain an order of the subset of the executed commands in the reduced set of commands such that remaining commands in the reduced set of commands have a same order as corresponding commands in the subset of the executed commands, and the trim module is configured to ignore time information of the remaining commands such that there is no time delay between execution of consecutive commands; and
a shortcut module configured to create a shortcut, the shortcut executing the reduced set of commands.

6. The apparatus of claim 5, further comprising a subset module configured to indicate sequentially executed commands to be included in the subset, the selection module selecting the subset of commands based on the sequentially executed commands.

7. The apparatus of claim 6, wherein the sequentially executed commands comprise commands executed in a common application.

8. The apparatus of claim 6, wherein the executed commands comprise configuration settings for an operating system.

9. The apparatus of claim 5, wherein the record comprises a threshold number of recently executed commands.

10. The apparatus of claim 5, wherein the record comprises commands executed over a recent threshold period of time.

11. The apparatus of claim 5, further comprising a determination module configured to ascertain a time for the selection module to select the set of executed commands.

12. The apparatus of claim 11, wherein the determination module ascertains a time based on a repeated pattern of executed commands.

13. The apparatus of claim 11, wherein the determination module ascertains a time in response to a command from a user.

14. The apparatus of claim 5, wherein the trim module further removes commands from the set by one or more of removing commands not executed in a common application, and removing commands executed in response to a request from an operating system.

15. A program product comprising a non-transitory computer readable storage medium storing machine readable code executable by a processor to perform:
maintaining a record of executed commands at a computing device, wherein the executed commands comprise time information that indicates a date and a time that a respective executed command was executed;

ascertaining a time to select a subset of recently executed commands;

selecting a subset of the recently executed commands based on one of a repeated pattern of executed commands, and a request from a user;

removing commands from the subset of the recently executed commands to produce a reduced set of commands, wherein the removed commands from the subset of the recently executed commands comprise a first one or more commands and a second one or more commands, the second one or more commands undoes the first one or more commands during execution, the first one or more commands and the second one or more commands are removed because the second one or more commands undoes the first one or more commands during execution, and removing the commands from the subset of the executed commands comprises maintaining an order of the subset of the executed commands in the reduced set of commands such that remaining commands in the reduced set of commands have a same order as corresponding commands in the subset of the executed commands;

ignoring time information of the remaining commands such that there is no time delay between execution of consecutive commands; and creating a shortcut to execute the reduced set of commands.

16. The computer program product of claim 15, wherein the operation of selecting a subset comprises selecting executed commands that were executed in a common application.

17. The computer program product of claim 15, wherein the operation of maintaining a record comprises one of storing commands executed over a recent threshold period of time and storing a threshold number of recent commands.

* * * * *